United States Patent
Johnson et al.

(12)

(10) Patent No.: US 11,288,061 B1
(45) Date of Patent: Mar. 29, 2022

(54) TRACKING SOFTWARE ASSETS GENERATED FROM SOURCE CODE USING A BUILD PIPELINE

(71) Applicant: Humana Inc., Louisville, KY (US)

(72) Inventors: Robert L. Johnson, Louisville, KY (US); Brett Edwards, Louisville, KY (US); Andrew Foster, Coxs Creek, KY (US); Michael Lochowitz, Green Bay, WI (US)

(73) Assignee: Humana Inc., Louisville, KY (US)

( * ) Notice: Subject to any disclaimer, the term of this patent is extended or adjusted under 35 U.S.C. 154(b) by 0 days.

(21) Appl. No.: 17/101,529

(22) Filed: Nov. 23, 2020

(51) Int. Cl.
  *G06F 8/71* (2018.01)
  *G06F 8/51* (2018.01)
  *G06F 9/48* (2006.01)
  *G06F 9/38* (2018.01)
  *G06F 8/77* (2018.01)

(52) U.S. Cl.
  CPC .............. *G06F 8/71* (2013.01); *G06F 8/51* (2013.01); *G06F 8/77* (2013.01); *G06F 9/3836* (2013.01); *G06F 9/4881* (2013.01)

(58) Field of Classification Search
  USPC .................................................... 717/121
  See application file for complete search history.

(56) References Cited

U.S. PATENT DOCUMENTS

| | | | |
|---|---|---|---|
| 10,365,919 B1 * | 7/2019 | Mandrika | G06F 8/71 |
| 2019/0317756 A1 * | 10/2019 | Bough | G06F 8/71 |
| 2019/0339945 A1 * | 11/2019 | Brealey | G06F 8/10 |

OTHER PUBLICATIONS

Beauregard, D. et al., "Compliance as Code and Applied DevOps," Nov. 27, 2019, six pages, [Online] [Retrieved on Jan. 5, 2021] Retrieved from the Internet <URL: https://dzone.com/articles/compliance-as-code-and-applied-devops>.
Bird, J., "DevOps in Regulated Environments," Date Unknown, 27 pages, [Online] [Retrieved on Jan. 5, 2021] Retrieved from the Internet <URL: https://www.sans.org/cyber-security-summit/archives/file/summit-archive-1510001564.pdf>.
Digital.ai, "Digital.ai Release advanced pipeline management," Date Unknown, nine pages, [Online] [Retrieved on Jan. 5, 2021] Retrieved from the Internet <URL: https://digital.ai/release>.

(Continued)

*Primary Examiner* — John Q Chavis
(74) *Attorney, Agent, or Firm* — Fenwick & West LLP

(57) ABSTRACT

A build system stores source code in source code repositories and generates deployment artifacts from a build pipeline. The build system receives requirements associated with certification criteria for certifying a deployment artifact based on the source code. The build system executes a build pipeline including build tasks that compile the source code to generate executable files storing executable instructions. The build system evaluates the certification criteria based on results of execution of the build tasks. The build system determines whether the deployment artifact is a certified deployment artifact based on the result of evaluation of the certification criteria. The build system stores a software asset information document in a source code repository identifying software assets build using the source code repository, for example, as a YAML file. The builds system generates reports that relate information describing source code repositories with software assets built using the source code repositories.

21 Claims, 5 Drawing Sheets

(56) References Cited

OTHER PUBLICATIONS

Dooley, D., "How automated compliance audits speed development," Mar. 1, 2019, seven pages, [Online] [Retrieved on Jan. 5, 2021] Retrieved from the Internet <URL: https://gcn.com/articles/2019/03/01/automated-security-analysis.aspx>.

Gallimore, J., "DevOps and Audit . . . and Security and Compliance," Sep. 2017, 82 pages, [Online] [Retrieved on Jan. 5, 2021] Retrieved from the Internet <URL: http://www.asq0511.org/Presentations/201709/ASQ0511_201709_DevOpsAuditandCompliance.pdf>.

Gallimore, J., "Top 3 Ways to Integrate DevOps and Security, Audit, and Compliance," Nov. 22, 2017, six pages, [Online] [Retrieved on Jan. 5, 2021] Retrieved from the Internet <URL: https://www.excella.com/insights/top-3-ways-to-integrate-devops-and-security-audit-and-compliance>.

Kelly, W., "Tackle DevOps compliance challenges with automation," Jun. 26, 2018, five pages, [Online] [Retrieved on Jan. 5, 2021] Retrieved from the Internet <URL: https://searchitoperations.techtarget.com/opinion/Tackle-DevOps-compliance-challenges-with-automation>.

KPMG, "Role of International Audit in DevOps," Jan. 2020, 16 pages, [Online] [Retrieved on Jan. 5, 2021] Retrieved from the Internet <URL: https://advisory.kpmg.us/content/dam/advisory/en/pdfs/2020/role-of-internal-audit-in-devops.pdf>.

Meedeniya, D.A. et al., "Traceability Establishment and Visualization of Software Artefacts in DevOps Practice: A Survey," (IJACSA) International Journal of Advanced Computer Science and Applications, vol. 10, No. 7, Jul. 2019, pp. 66-76.

Nelson, K., "The Automation of Compliance," May 26, 2016, eight pages, [Online] [Retrieved on Jan. 5, 2021] Retrieved from the Internet <URL: https://devops.com/devops-automation-compliance/>.

Veritis, "DevOps Regulatory Compliance," Date Unknown, six pages, [Online] [Retrieved on Jan. 5, 2021] Retrieved from the Internet <URL: https://www.veritis.com/solutions/devops/regulatory-compliance/>.

Zilberman, E., "The importance of traceability," Sep. 25, 2019, six pages, [Online] [Retrieved on Jan. 5, 2021] Retrieved from the Internet <URL: https://www.atlassian.com/blog/devops/the-importance-of-traceability>.

* cited by examiner

TRACKING SOFTWARE ASSETS GENERATED FROM SOURCE CODE USING A BUILD PIPELINE

BACKGROUND

The disclosure relates to building of deployment artifacts, for example, executable files or compressed archives by compilation of source code stored in version control systems in general and more specifically to tracking of software assets generated from source code using build pipelines.

Code repositories, including source code management systems, revision control systems and/or versioning systems, such as, concurrent versions system (CVS), Apache Subversion (SVN), Linux GIT, and so on are used for storing computer program code. A build pipeline, for example, a continuous integration pipeline may be used to compile the source code and execute various scripts necessary to generate a deployment artifact that may be deployed in a production runtime environment. An example of a deployment artifact is an executable file storing executable instructions, for example, a binary file or a compressed archive of a set of executable files.

A deployment artifact targeted for a particular runtime environment may have to satisfy certain criteria to be considered deployable in the targeted runtime environment. For example, certain target runtime environment may require more rigorous testing of the computer program code before the deployment artifact is generated. Similarly, a target runtime environment may require rigorous scan of the source code for identifying source code security vulnerabilities. Conventional techniques for certifying deployment artifacts are manual, cumbersome, and error prone. Furthermore, an enterprise may generate various software assets such as applications, web services, libraries, plug-ins and so on. Various policies related to source code are affected by decisions made for software assets. For example, development resources may be affected by decisions made regarding distribution of software assets. Conventional techniques require manual handling of any such policy changes, making the process slow and error prone.

SUMMARY

Embodiments generate deployment artifacts from a pipeline of source code, for example, a build pipeline or a release pipeline. A build system stores source code in source code repositories. The build system receives a build request to execute a build pipeline using source code stored in a source code repository. The build system receives a set of requirements for the build request. Each requirement from the set is associated with one or more certification criteria for certifying a deployment artifact based on the source code. The build system executes a build pipeline including multiple build tasks. The build tasks include at least a task for compilation of the source code to generate executable files storing executable instructions. The build system generates a deployment artifact based on the executable files generated by compilation of the source code. The build system evaluates the certification criteria based on results of execution of the build tasks. The build system determines whether the deployment artifact is a certified deployment artifact based on the result of evaluation of the certification criteria. The build system determines whether to deploy the deployment artifact to a target runtime environment based on the determination.

According to an embodiment, the builds system generates reports that relate information describing source code repositories with software assets built using the source code repositories. A software asset is deployed as an executable file generated by building one or more source code repositories. The build system stores a software asset information document identifying software assets build using a source code repository. For example, the software asset information document may be a YAML file that stores identifiers of software assets. The build system receives a request identifying one or more software assets built using source code repositories. For each identified software asset, the build system identifies source code repositories associated with the software assets using the software asset information document of the source code repository. The build system extracts attributes of each of the source code repositories associated with the software assets. The build system generates a report based on the source code repositories. The report associates attributes describing the source code repositories with corresponding software assets built using the source code repositories. The build system sends the generated report to the requestor. The build system may take actions associated with source code repositories based on information describing the software assets, for example, adjusting schedule of tasks associated with source code repositories, sending messages or notifications to developers associated with source code repositories, triaging features and defects associated with source code repositories, and so on.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Overall System Environment

Figure 1:
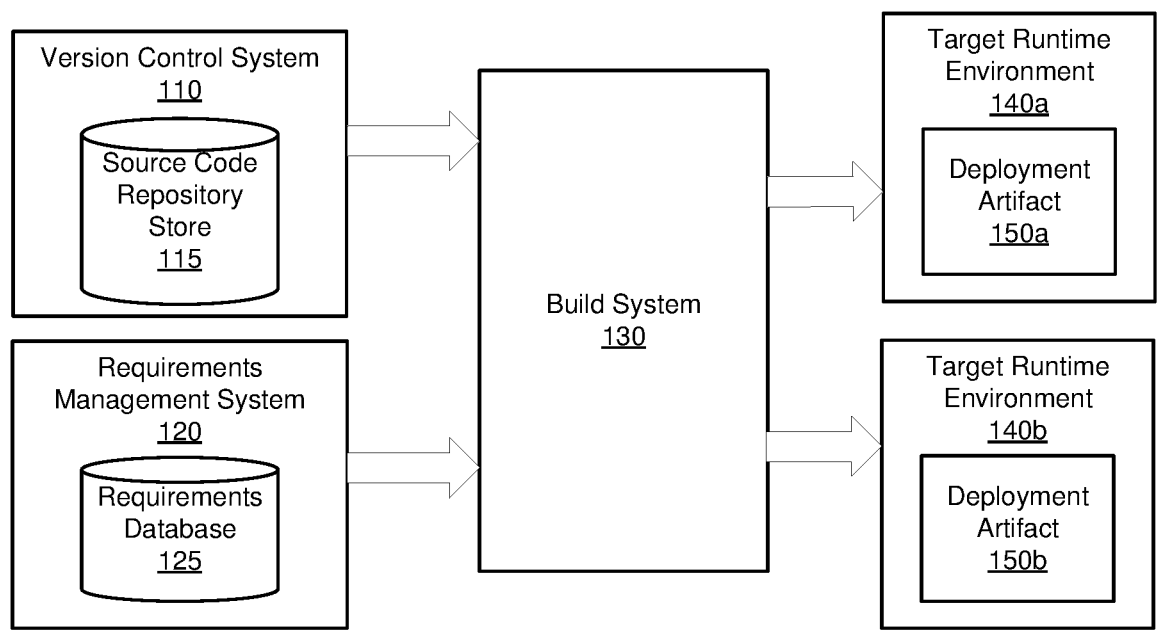
FIG. 1 shows the overall system environment for certifying deployment artifacts based on source code, according to an embodiment.

FIG. 1 shows the overall system environment for certifying deployment artifacts based on source code, according to an embodiment. The overall system environment includes a version control system 110, a requirements management system 120, a build system 130, and a target runtime environment 140. In other embodiments, more or fewer systems/components than those indicated in FIG. 1 may be used. Although several techniques are described herein in the context of a build pipeline, the techniques are applicable to release pipeline of deployment artifacts also.

The version control system 100 stores source code, for example, as files stored in a persistent storage system. The version control system 100 helps record changes to source code files by keeping a track of modifications done to the source code. The version control system 110 includes a source code repository store 115 that stores source code received from developers. In an embodiment, the source code repository store 115 stores all modifications and versions of source code files. Users of the version control system 100 are typically developers and testers of source code. The version control system 100 receives requests from users to make a copy of the source code. Users can edit to the copy of source code, without affecting the work of others and finally commit their changes to the source code repository store 115 when they are done making your changes. The version control system receives an association between each code commit and a work item that maps to a requirement stored in the requirements database. A project requirement may be associated with multiple work items that represent tasks or sub-tasks that need to be performed to meet the project requirement. A work item may be specification received in the form of a message or story from a user. For example, a project requirement may be to add a functionality to an application and individual work items may concern adding user interface features for the functionality, making server-side extensions for the functionality, integrations with external systems, and so on. Each work item may be performed by modifying the source code, for example, by adding new source code, modifying existing source code, or deleting existing source code. In an embodiment, the version control system presents a user with a user interface that allows the user to select a work item or a requirement from the requirements database for a code commit.

According to some embodiments, the version control system 100 is centralized with one source code repository used by all users. In other embodiments, the version control system 100 is distributed with multiple source code repositories. The version control system 100 integrates the development work performed by multiple users in the source code repository store 115. The version control system 100 also provides access to historical data, for example, older version of source code. The version control system 100 allows users to roll back to older versions of source code, for example, if a source code defect gets introduced in a check in.

The requirements management system 120 stores requirements of an organization that correspond to features that are developed and provided to external users via the source code. A requirement may also be referred to as a project requirement. The requirements management system 120 manages the process of documenting, analyzing, tracing, prioritizing and reaching agreements on requirements associated with an organization. A requirement may represent a new feature or may represent fixing an existing feature, enhancing an existing feature, or modifying an existing feature. A feature may be implemented using a set of source code files that are stored in the source code repository. Requirements may be received from users of an organization, for example, marketing, engineering, quality assurance groups, and so on. The requirements management system 120 includes a requirements database 125 that stores records that represent various requirements. In an embodiment, each requirement is represented using one or more records that store an identifier for uniquely identifying the requirement, a description of the requirement, one or more users that provided the requirement, one or more groups within the organization that are associated with the requirement, for example, groups that manage the requirement and make sure that the requirement is implemented via the source code and is maintained after the source code it is shipped. The requirements database 125 further stores certification criteria associated with various requirements. The certification criteria determine whether a deployment artifact can be certified based on the execution of build pipeline. The details of the certification criteria are further described herein in connection with FIG. 2.

The build system 130 processes source code stored in the source code repository 115 to generate deployment artifacts 150 that can be deployed in target runtime environments 140. Details of the build system 130 are further described herein, for example, in relation to FIG. 2. The deployment artifact 150 may be an executable file storing executable instructions, for example, a binary file or a compressed archive of a set of executable files. A deployment artifact may be a .dll or .exe executable file or a .PDB symbols file of a .NET or C++ Windows app, or a jar file or a WAR (web application archive file) generated from JAVA code. The deployment artifact 150 may be stored in a persistent storage of a computing system and is loaded to memory of the computing system for execution. Other types of programming languages or development environments may generate other types of deployment artifacts.

A target runtime environment 140 is any system that is configured to deploy a deployment artifact 150 generated by the build system 130. For example, target runtime environment 140 may execute an application that deploys the deployment artifact 150. The target runtime environment 140 may execute an operating system that deploys the deployment artifact 150. The target runtime environment 140 may execute a web server that deploys the deployment artifact 150. The target runtime environment 140 may execute on a client device, for example, a mobile device, a server, a robot, a self-driving vehicle, and so on.

FIG. 1 and the other figures use like reference numerals to identify like elements. A letter after a reference numeral, such as "140a," indicates that the text refers specifically to the element having that particular reference numeral. A reference numeral in the text without a following letter, such as "140," refers to any or all of the elements in the figures bearing that reference numeral (e.g. "140" in the text refers to reference numerals "140a" and/or "140b" in the figures).

The various systems shown in FIG. 1 may interact via a network (not shown in the figure.) The network enables communications between the various systems. In one embodiment, the network uses standard communications technologies and/or protocols. In another embodiment, the entities can use custom and/or dedicated data communications technologies instead of, or in addition to, the ones described above. Depending upon the embodiment, the network can also include links to other networks such as the Internet.

System Architecture of the Build System

Figure 2:
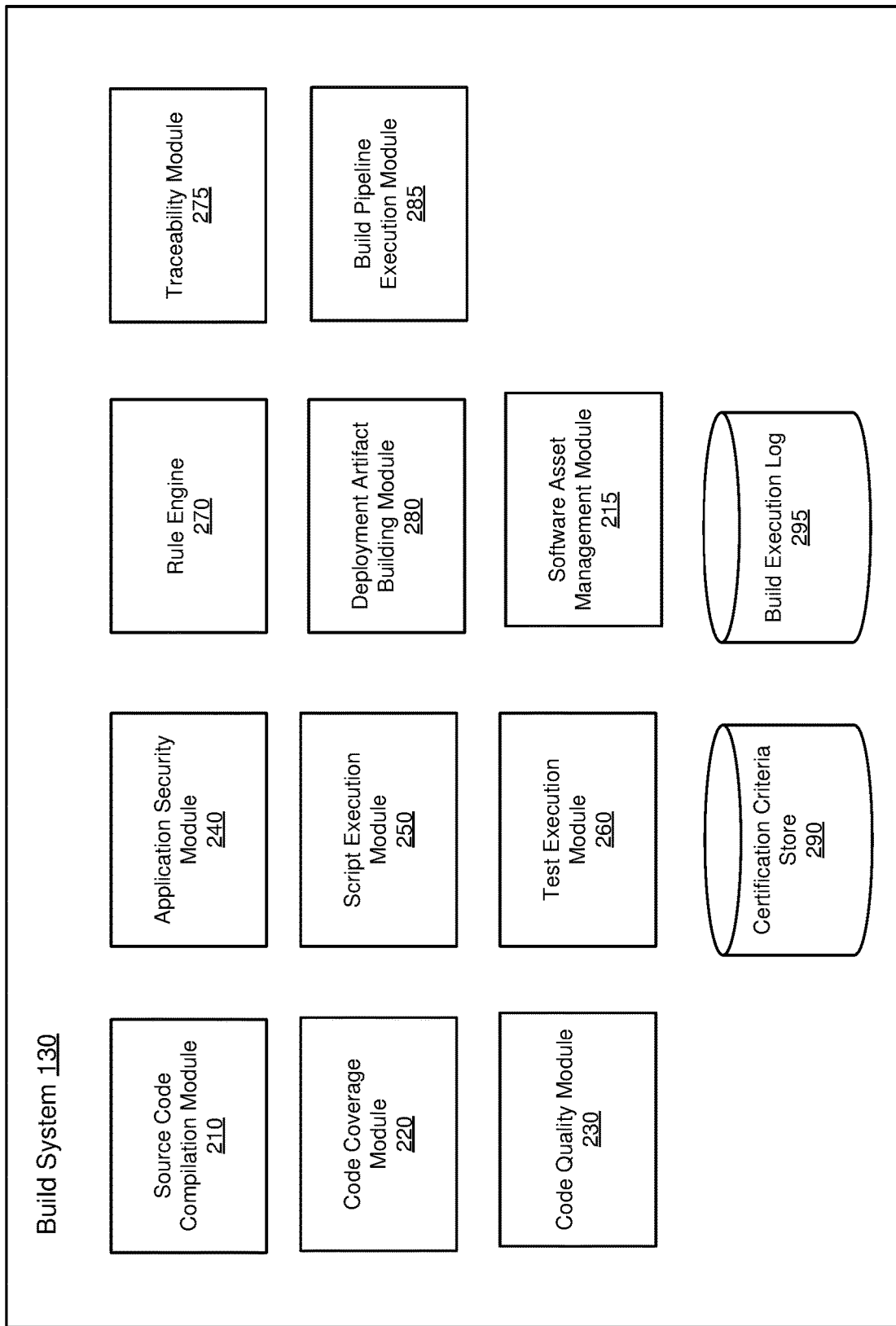
FIG. 2 shows the system architecture of the build system, according to an embodiment.

FIG. 2 shows the system architecture of the build system, according to an embodiment. The build system 130 includes modules including: source code compilation module 210, software asset management 215, code coverage module 220, code quality module 230, application security module 240, script execution module 250, test execution module 260, rule engine 270, deployment artifact building module 280, certification criteria store 290, traceability module 275, build pipeline execution module 285, and build execution log 295. This is one embodiment of the build system 130, and in other embodiments, there may be more or fewer modules.

The source code compilation module 210 converts source represented using high level programming languages, for example, JAVA, C, C++, C #, and so on to instructions using a lower level programming language such as assembly language or machine-code that can be read and executed by a computer. The source code compilation module 210 may perform various operations using the input source code, for example, preprocessing, lexical analysis, parsing, semantic analysis, conversion of input source code to an intermediate representation, code optimization, and code generation. The source code compilation module 210 may generate one or more files storing executable code that are further processed to generate deployment artifacts. For example, multiple files storing executable code may be combined into one deployment artifact 150.

The code coverage module 220 processes the source code to generate a metric that indicates the amount of source code that is tested by running a set of test cases. The code coverage module may measure different metrics that indicate different types of code coverage, for example, function coverage indicating a number of functions defined that were invoked as a result of running the test cases, statement coverage indicating a number of statements in the source code that were executed, as a result of running the test cases, branches coverage indicating a number branches of the control structures that were executed by running the test cases, condition coverage representing a number of boolean sub-expressions that were tested for a true and a false value, or line coverage indicating a number of lines of source code that have been tested. The code coverage module may generate a metric that represents a fraction or percentage of the total number of units covered, for example, statements, branches, control structures, conditions, lines, and so on.

The code quality module 230 determines a measure of code quality for the input source code, for example, based on criteria such as the amount of documentation, security issues that may be detected automatically via code analysis, and so on. The code quality module 230 determines code quality based on various metrics such as code comment density, number of calling functions per function, number of function parameters, number of call levels, number of return points with a function, and so on. The code quality module 230 performs code analysis using techniques such as data flow analysis. The code quality module 230 may also use other factors in determining the measure of code quality such as a number of runtime errors encountered during execution of test cases such as out-of-bound array access, division by zero errors, flow overflow, integer overflow/underflow, accessing non-initialized data, incorrect return type of functions, wrong type of argument passed to functions, and so on. In an embodiment, the code quality module 230 determines a measure as a percentage of operations that cause an error compared to total number of operations of that type in the source code, for example, a number of divisions that case division by zero error divided by the total number of division operations in the source code.

The application security module 240 analyzes the source code to determine a measure of security of the source code. Accordingly, the application security module 240 determines a measure of security coverage of the source code that indicates security vulnerabilities that make applications based on the source code susceptible to attacks. The application security module 240 may perform static analysis of the source code to identify vulnerabilities in the source code. The application security module 240 may analyze the source code by typically involves finding specific patterns in the source code that suggest suspicious code, without running the source code. The application security module 240 may look for patterns using regular expressions to identify security vulnerabilities. The application security module 240 may build a logic graph representing the code architecture and its relations to analyze security vulnerabilities.

The script execution module 250 executes script code to perform instructions of build pipeline that may be provided by users such as developers. Accordingly, developers may include customized scripts for performing specific tasks during build. The script execution module 250 allows developers to include customized operations during the build process, for example, determining customized metrics based on code analysis, accessing customized libraries for execution during the build process, and so on.

The test execution module 260 executes test cases. The test execution module 260 determines the number of test cases that pass and the number of test cases that fail. In an embodiment, the build system 130 determines whether the build is successful or failed based on the number of test cases determined to pass by the test execution module 260. The test execution module 260 generates a metric indicating of the percentage of test cases that passed for the build.

The certification criteria store 290, stores certification criteria for deployment artifacts. Each certification criteria may be represented as an expression, for example, a boolean expression that evaluates to true if the certification criteria are met and false otherwise. The certification criteria may be based on thresholds of various metrics that should be met to satisfy the certification criteria, for example, the code coverage metric C should be greater than 85%, the measure of security of the source code should be greater than 95%, and the measure of code quality should be greater than 8. In an embodiment, each set of certification criteria is associated with a requirement stored in the requirements database 125. In another embodiment, each requirement is associated with a set of users, for example, a team within a organization and the certification criteria is associated with a team. In another embodiment, each requirement is associated with a project and the certification criteria is associated with the project. The build system determines the certification criteria for a deployment artifact by identifying all the requirements corresponding to the build of the source code, determining the certification criteria corresponding to each identified requirement, and determining an aggregate certification criterion by aggregating the determined certification criteria.

In an embodiment, the certification criteria are specified in the form of rules, where each rule represents an expression based on one or more metrics describing the source code determined by the build system 130. The rule engine 270 executes the different rules corresponding to the certification criteria associated with a build to determine whether the deployment artifact being built satisfies the certification criteria.

The deployment artifact building module 280 packages the executable files generated from the source by the source code compilation module 210 and other build processes to generate the deployment artifact. For example, the deployment artifact building module 280 may build an archive based on a set of executables or a dynamic link library (DLL) based on a set of executable files generated from the source code.

The traceability module 275 determines traceability links between source code and corresponding requirements stored in the requirements database 125. The traceability links may be created manually by developers by identifying the requirements that a code check in is related to. In some embodiments, traceability module 275 automatically determines traceability links. For example, various test cases are associated with different requirements. The traceability module 275 monitors the source code as a test case is executed to determine which check ins represent code that is being executed. Accordingly, the traceability module 275 maps code check ins and code modifications to requirements.

The build pipeline execution module 285 executes the various steps of the build pipeline to perform the build process. The build pipeline execution module 285 build pipeline execution module 285 may be executed on a periodic basis, for example, once a day at a predetermines time. Alternatively, the build pipeline execution module 285 may execute the build process in response to pull requests. The build process executes various modules of the build system 130 to execute various operations as well as determine various metrics. The result of execution of the build process is stored in the build execution log 295. Accordingly, the build system can access the build execution log 295 to determine the values of the various metrics corresponding to a build to determine whether a given certification criteria for a deployment artifact is met.

Figure 4:
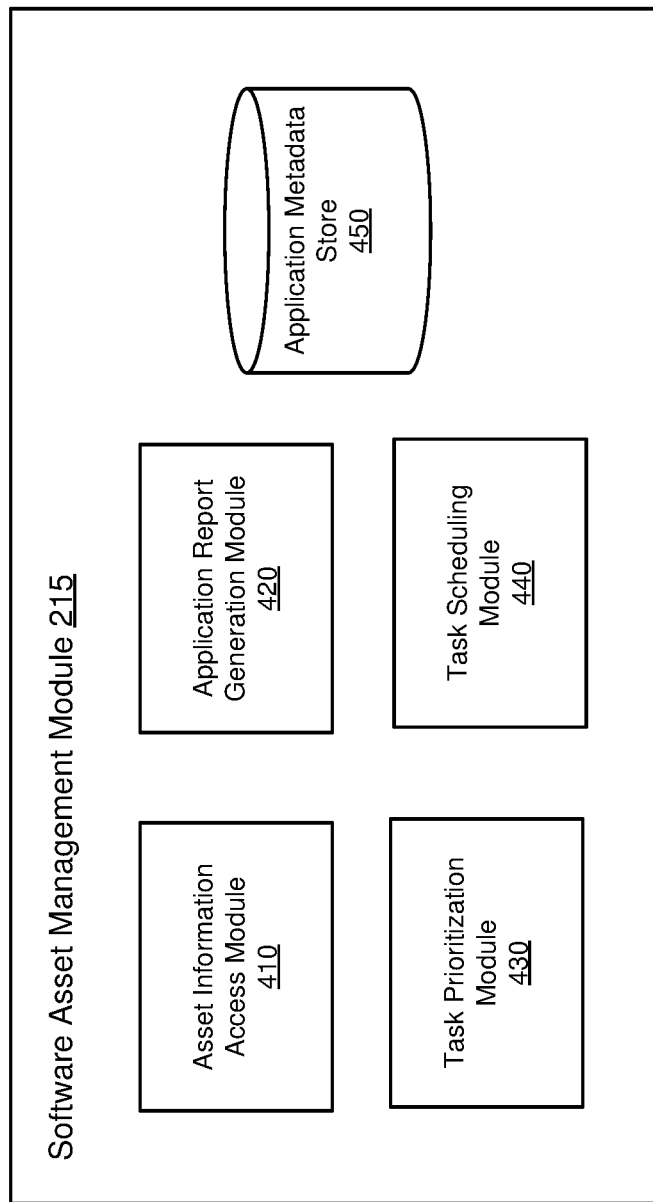
FIG. 4 shows the architecture of the software asset management module according to an embodiment.

Details of the software asset management module 215 are described in connection with FIGS. 4-5. A measure indicating of certain aspect of a build may also be referred to as a metric or a score. A measure may be an absolute numeric value, for example, a number of test cases that failed; a percentage value, for example, 90% code coverage; or a fraction value, for example, 0.9 indicating the fraction of the total lines of code that were covered by the test cases.

Overall Process for Certifying Deployment Artifacts

Figure 3:
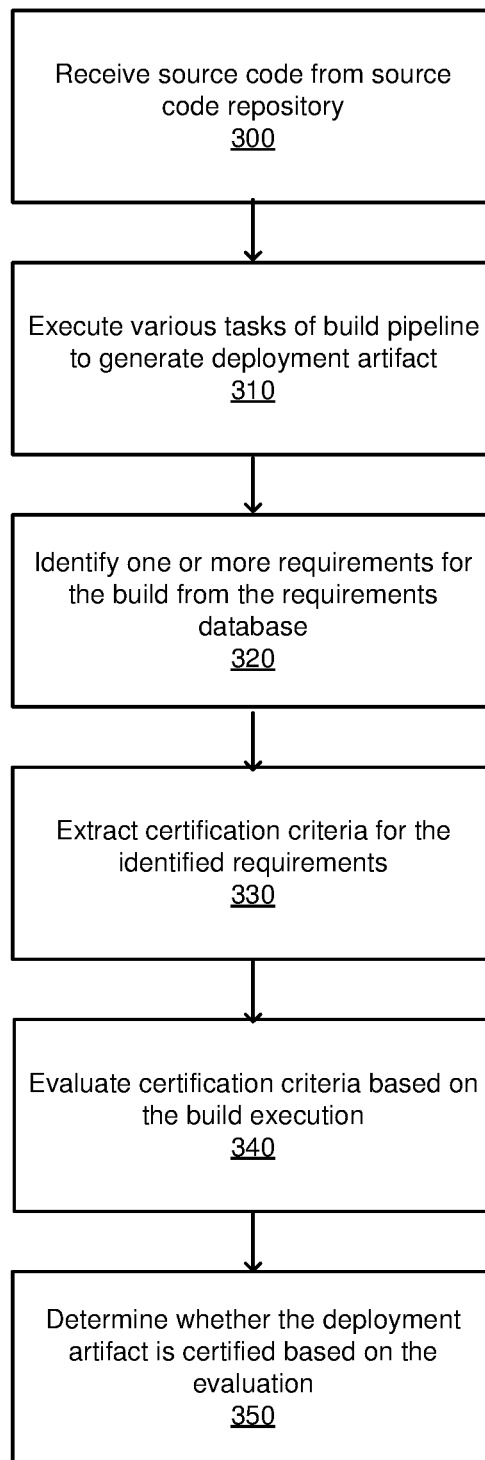
FIG. 3 illustrates the process of certifying a deployment artifact by a build system, according to one embodiment.

FIG. 3 illustrates the process of certifying a deployment artifact by a build system, according to one embodiment. The steps shown in the flowchart of FIG. 3 may be executed in an order different from that indicated in the figure. For example, certain steps may be executed in parallel.

The build system 130 receives a request to build source code stored in the source code repository. The request may be generated by a scheduler configured to generate the request periodically or the request may be generated in response to a pull request received by the build system 130. The build system 130 receives 300 the source code from the source code repository.

The build system 130 executes 310 various tasks of the build pipeline to generate a deployment artifact. The build system executes the build pipeline using the source code to generate a deployment artifact 150 that can be transmitted to a target runtime environment 140. These tasks may be specified by a developer and are executed by the build pipeline execution module 285. The tasks include various tasks that can be performed by the modules of the build system as shown in FIG. 2 and described in the description of FIG. 2. For example, the build pipeline may include a task for restoring dependencies, a task for compiling source code, running unit tests, performing code quality analysis, determining unit test coverage, determining security vulnerabilities, and so on. The build pipeline fails if certain tasks are not completed successfully. For example, if the source code compilation is not successful, the build pipeline fails, and the developer has to modify the source code in the source code repository to make sure it compiles successfully. Accordingly, if the build pipeline fails, the source code repository receives an updated source code for re-executing the build pipeline. There may be some tasks that may fail but do not cause the build pipeline to fail.

The build system 130 identifies 320 one or more requirements for the build from the requirements database. In an embodiment, the source code repository received code commit requests such that each code commit request is annotated with a work item that is mapped to a project requirement stored as a record in the requirements database. Accordingly, the build system identifies all the code commit requests that correspond to the build. These code commit requests were received for this specific build. The build system identifies the code commit requests and their corresponding work items. The build system determines all requirements associated with the build based on the code commit requests received for the build.

The build system 130 extracts 330 certification criteria for the identified requirements for the build. The build system 130 evaluates 340 the certification criteria based on the execution of the build. The build system 130 may determine whether the code coverage determined during the build pipeline execution meets the threshold specified in the certification criteria. In an embodiment, the certification criteria include a list of required tasks for the build pipeline. The build system checks if all the required tasks were executed and completed successfully.

The build system 130 determines 350 whether the deployment artifact is certified based on the evaluation of the certification criteria. In an embodiment, the build system generates a deployment artifact that may be certified or uncertified. If a deployment artifact is generated that is uncertified, the build system generates a warning indicating that the deployment artifact is uncertified. The warning further describes the reason why the deployment artifact failed certification by identifying the certification criteria that failed. For example, a warning may specify that the deployment artifact failed certification because the code quality was below certain threshold. A developer monitoring the build process may take action in response to the warning, for example, by taking appropriate measures and re-executing the build pipeline until a certified deployment artifact is generated. The build system allows developers to generate uncertified deployment artifacts so that they can be used for certain purposes, for example, for testing or executing in a staging area. In an embodiment, the build system blocks a deployment artifact to be released to a production environment if the deployment artifact failed certification. For example, the build system may not allow the uncertified deployment artifact to be sent to target runtime environment for deployment. Alternatively, the build system may generate a warning or send an alert whenever an uncertified deployment artifact is being sent to a target runtime environment indicating that the deployment artifact being transmitted is uncertified. The alert may be sent to one or more users responsible for release of the deployment artifact.

In some embodiments, the build system 130 associates a deployment artifact with one of a plurality of levels of certification. For example, there may be level A certification, level B, certification, level C certification, and so on. The levels have an order such that a level that is higher than another level requires more stringent certification criteria. For example, if level A is higher than level B, the code quality score required for level A may be higher than the code quality score required for level B. A deployment artifact may have multiple components, each component having a different level of certification.

In an embodiment, the build system further executes a release pipeline that performs specific process checks on the build execution, for example, a number of test cases that were executed, whether there are any open defects for that build that have not been fixed, results of security scanning including dynamic security scanning, and so on. In an embodiment, the release pipeline is executed only for a production release and not on releases that are still being tested and developed.

The processes described herein allow the build system to ensure that a deployment artifact was built in a manner that satisfies any certification criteria corresponding to any requirements. This allows the organization that uses the build system to store and present any necessary records of the build process in case the organization is audited. Such auditing is common in certain industries, for example, health care industry, finance industry, manufacturing, and other industries where it is important to ensure that software development and release processes are adhering to certain industry wide policies, rules, or code quality standards that ensure high quality code being developed and deployed.

Software Asset Management

The software asset management module 215 includes instructions for managing software assets of an organization based on information stored in source code repository store 115. FIG. 4 shows the architecture of the software asset management module according to an embodiment. The software asset management module 215 includes an asset information access module 410, an application report generation module 420, a task prioritization module 430, a task scheduling module 440, and application metadata store 450. Other embodiments may include more or fewer modules. A software asset can be an application built and deployed using one or more source code repositories. A software asset can be any other deployable entity based on the source code, for example, a library, an executable file, The application metadata store 450 stores metadata describing applications that are deployed or may be deployed by the build system 130. The metadata describing an application includes a type of application, for example, a mobile application, a web service, and so on; a date when the application was deployed or is expected to be deployed; a team of the organization responsible for the application; the level of security associated with the development and deployment of the application, and so on.

The asset information access module 410 manages information describing software assets or applications that are generated from the code repositories stored in the code repository store 115. In an embodiment, the information describing the applications generated from a source code repository is stored as a document in the code repository. The document represents information in a human readable text and may be a YAML ("YAML Ain't Markup Language") document or a markup language document that, for example, an XML (extensible markup language) document. The document stored in a code repository with information describing the application generated by the code repository is referred to as the software asset information document. The software asset information document includes metadata describing the code repository including one or more applications that are based on source code stored in the code repository. The software asset information document may also be referred to as software asset inventory document. The software asset information document includes an identifier for each software asset that incorporates the source code repository.

A software asset based on source code repositories can be any executable program that is built using the source code stored in the source code repository, for example, an application, web service, mobile application, standalone application that can execute on any computing platform, or an online application and is not limited to these. The build system 130 generates a deployment artifact that includes the executable instructions for the application. The deployment artifact is transmitted to a target computing system and the application can be deployed in the target computing system.

The application report generation module 420 generates various kinds of reports describing applications that are deployed or may be deployed in future by the build system 130 and attributes of source code for the applications. The reports may be requested by users, for example, system administrators. The application report generation module 420 accesses the metadata describing the applications requested in the report and attributes describing the source code repositories for the applications and incorporates them in the report generated.

The task prioritization module 430 determines priorities of various tasks associated with development of source code. In an embodiment, the task prioritization module 430 adjusts the priorities of tasks associated with specific code repositories based on the applications identified in the asset information document associated with the source code repository. The task prioritization module 430 may determine that tasks associated with development/testing for certain source code repositories more important than tasks associated with development/testing of other source code repositories based on the applications associated with the source code repositories. The task prioritization module 430 may rank the tasks for display in a user interface based on their significance.

The task scheduling module 440 schedules development and testing related tasks fore source code repositories based on the applications identified in the asset information document for the source code repositories. For example, the task scheduling module 440 monitors the deployment schedules for applications and determines the schedules for the tasks of source code repositories associated with the applications.

Figure 5:
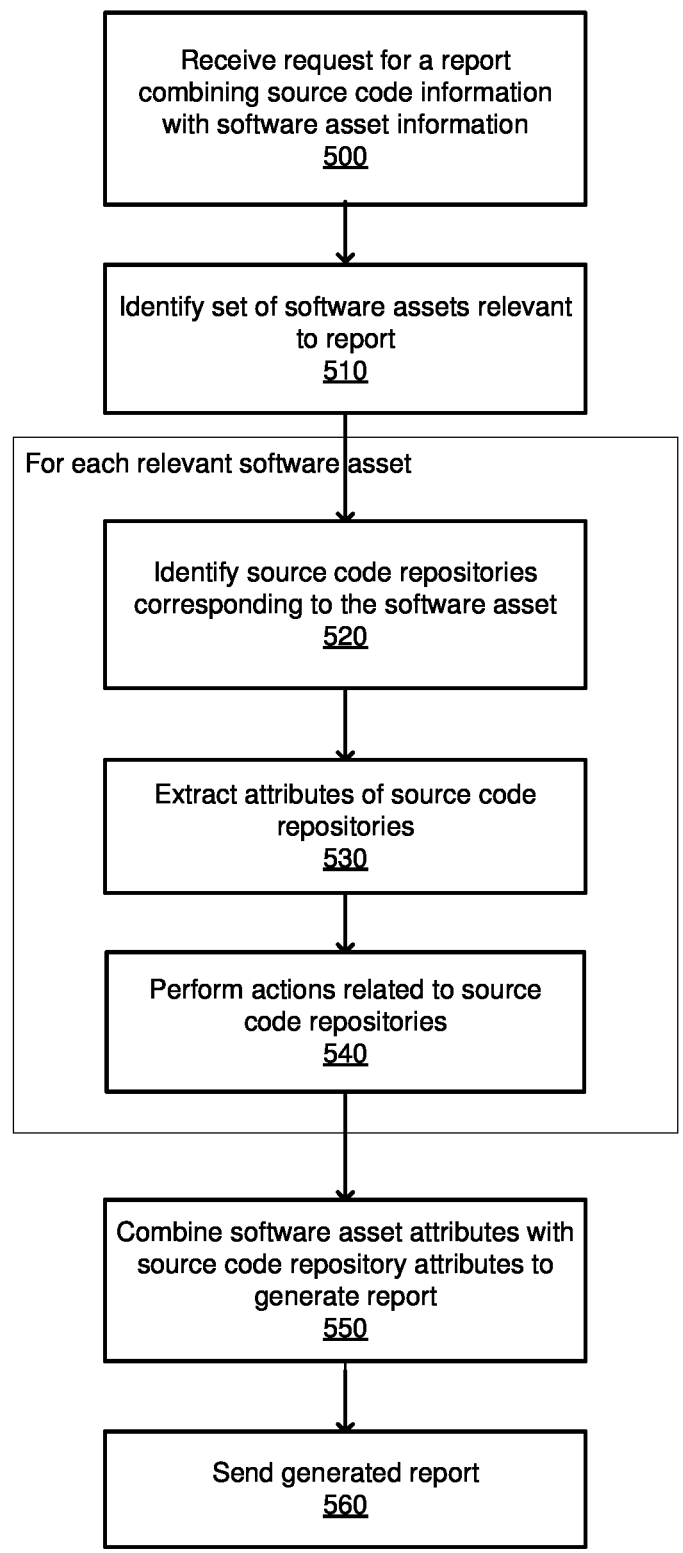
FIG. 5 illustrates the process of managing software assets based on information stored in source code repository, according to one embodiment.

FIG. 5 illustrates the process of managing software assets based on information stored in source code repository, according to one embodiment. The build system 130 receives 500 a request for a report combining source code information with software asset information. The software asset information may also be referred to as application portfolio information. The build system 130 identifies 510 applications relevant for the report. For example, the request may identify all software assets being developed by a particular team or group of developers of an organization. The request may identify all software assets that are associated with more than a threshold revenue. The request may identify all software assets that have more than a threshold number of deployments. The request may identify software assets based on geographical regions in which they are deployed. The request may identify software assets based on the type of industries they are being deployed in.

The build system repeats the following steps 520, 530, and 540 for all software assets identified 510. The build system 130 identifies 520 source code repositories corresponding to the software asset. The build system identifies the source repositories corresponding to a software asset based on the identifiers specified in the software asset information documents of the source code repositories.

The build system 130 extracts 530 attributes of source code repository as requested by the report. For example, the attributes describing the source code repository may be the size of the source code repositories, the number of commits or changes made to the source code repository in a time interval, the number of defects related to the source code repository that were opened, number of defects related to the source code repository that were fixed, information describing developers that performed commits related to the repository, and so on.

The build system 130 may perform 540 actions associated with the identified source code repositories. Examples of actions performed include sending notifications to users such as developers, testers, and project managers associated with the source code repository, adjusting the schedule related to development, testing, and other activities associated with the repository, triaging defects/features and other development tasks associated with the source code repository, and so on.

The build system 130 combines 550 software asset attributes with source code repository attributes to generate report. For example, the report may describe the number of deployments across software assets built from each source code repository. The report may describe the number of defects associated with source code repositories for a set of applications, for example, the number of defects that were fixed during a time interval, the number of defects that were opened for the source code repositories associated with a set of applications, and so on.

The build system 130 sends 560 the generated report to the requestor. The build system 130 may display the generated report on a user interface, for example, as a web page displayed on an internet browser. The build system 130 may send the report via a communication channel, for example, via an email, a notification, and so on.

Applications Based on Software Assets and Source Code Repositories

The process described in FIG. 5 allows the build system to perform various applications that integrate software asset information with source code repository information.

In one embodiment, the build system adjusts priority of tasks associated with source code repositories based on software asset information. The build system receives software asset information including number of deployments of a software asset, deadlines for deployments of a software asset, user feedback for a software asset. Number of past and planned deployments of a software asset are used as an indication of value of the software asset. The indication of a value of a software asset may be provided by a user via a user interface. The information describing value of software assets is used to prioritize tasks related to software assets. For example, higher value software assets are prioritized over lower value software assets. Accordingly, tasks related to a source code repository that is used for building a software asset determined to have higher value are given higher priority compared to tasks related to a source code repository that is used for building a software asset determined to have lower value. Examples of tasks include development of new features, fixing of defects, allocation of resources for development/testing of the source code repository, assigning of developers/testers to the source code repository. The build system may perform certain actions or send recommendations to perform actions that is approved by a user.

In an embodiment, the build system receives changes to indications of value of a software asset and accordingly adjusts priority of tasks related to source code repositories used to build the software asset. For example, the build system may receive an indication that the value of a software has gone up as indicated by an increase in number of deployments or increase in number of user interactions with the software asset such as number of downloads of a software asset that is downloadable or number of user interactions with a software asset that is running in an online system such as a web service. Accordingly, the build system may take action or recommend actions related to a source code repository used for building the software asset including allocation of additional resources such as developers/testers or computing resources for the source code repository, adjusting development/testing schedules based on the urgency of the tasks such that tasks for source code repositories associated with high value software assets are prioritized and scheduled for earlier completion compared to tasks for source code repositories associated with low value software assets.

In an embodiment, the build system adjusts the certification criteria applicable to the source code repository based on the information describing the corresponding software assets. For example, the build system may increase the number of test cases that need to be executed to certify source code repositories associated with higher value software assets, the build system may increase the amount of code coverage needed to certify source code repositories associated with higher value software assets, and adjust other metrics to that require stricter measures to certify the source code repository.

In an embodiment, the build system receives an auditing request for a software asset. The build system identifies all the source code repositories that are used for building the software asset, for example, as described in step 520 of FIG. 5. The build system accesses build logs to determine various steps that were executed for building the source code repositories and also for certifying the source code repositories. The build system generates a report describing the build process and the certification process and provides the report in response to the audit request.

In an embodiment, the build system receives a request to determine a development/testing status of a project associated with a software asset, for example, a project that adds a feature or fixes defects for the software asset. The build system identifies the source code repositories used for building the software asset. The build system accesses a version control system or a defect/feature tracking system to aggregate the status of the various tasks associated with the source code repositories identified. The build system generates an aggregate measure of the status indicating a measure of an amount of work/effort remaining to complete the project, for example, based on the number of unfinished tasks.

In an embodiment, the build system sends an alert of message to all teams/developers/testers working on source code repositories used for building a software asset. The build system receives information identifying a software asset. The build system identifies the source code repositories used for building a software asset. The build system uses a version control system used for storing the source code repositories to identify users associated with the source code repositories, for example, users that have committed changes to the source code repositories, users that have checked out files from the source code repository currently or in the past, users that have permissions to access the source code repositories, and so on. The build system sends any alert/message/notification to the set of users identified.

In an embodiment, the build system receives as input information identifying a source code repository and generates metrics describing the usage of a given source code repository. The build system identifies the software assets that are built using the source code repository. The build system accesses information describing the software assets identified, for example, the number of deployments, measures indicating a level of usage of the software assets after deployment, and so on. Accordingly, the build system determines a measure of usage for a source code repository. In an embodiment, the build system users the measure of usage of source code repositories to determine how information describing the source code is presented via user interfaces. For example, the build system may rank the source code repositories in an order determined based on usage of their corresponding software assets by ranking source code repositories used for building higher usage or higher value software assets higher than source code repositories used for building lower usage or lower value software assets.

The use of the software asset information document in the source code repositories ensures that the information describing the source code repositories can be correlated with software asset information accurately. The correlation is accurate even if changes are made to the source code repositories, for example, if the source code repository is moved to a different folder or renamed, so long as the software asset information document accurately identifies the software assets that are built using the source code repository. Accordingly, the information generated by the build system that correlates the software assets with source code repositories is accurate and does not change if a source code repository R1 is renamed to R2 or is moved from one location in the source code hierarchy to another location.

Alternative Embodiments

It is to be understood that the Figures and descriptions of the present invention have been simplified to illustrate elements that are relevant for a clear understanding of the present invention, while eliminating, for the purpose of clarity, many other elements found in a multi-tenant system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of the above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method executed by a build system comprising:
   storing, in a build system, a plurality of source code repositories, wherein a source code repository includes a software asset information document identifying one or more software assets build using the source code repository, wherein each software asset is deployed as an executable file generated by compiling source code stored in one or more source code repositories;

receiving, from a requestor, a request identifying one or more software assets built using source code repositories stored in the build system;

for each of the one or more software assets identified in the request, obtaining information describing source code repositories associated with the software asset comprising:

identifying one or more source code repositories wherein the software asset information document of each identified source code repository identifies the software asset; and extracting one or more attributes of each of the one or more source code repositories;

generating a report based on the source code repositories associated with each of the one or more software assets, the report based on attributes of the source code repositories; and sending the generated report to the requestor.

2. The method of claim 1, further comprising:

for a source code repository associated with an identified software asset, determining a certification criteria for deployment artifacts based on information describing the identified software asset.

3. The method of claim 1, further comprising:

for a source code repository associated with an identified software asset, adjusting schedule of one or more tasks associated with the source code repository based on information describing the identified software asset.

4. The method of claim 3, wherein the one or more tasks comprise development or testing of a feature associate with the source code repository or fixing a defect in the source code repository.

5. The method of claim 3, wherein the information describing the identified software asset comprises, one or more of:

a rate of download of a deployment artifact for the software asset, a rate of user interactions with the software asset.

6. The method of claim 1, further comprising:

for a source code repository associated with an identified software asset, identifying a set of users associated with development of the source code repository and sending a message associated with the software asset to the set of users.

7. The method of claim 1, wherein the one or more attributes comprise a number of defects in the source code repository that were either identified or fixed in a particular time interval, the generated report describing the number of defects associated with software assets.

8. The method of claim 1, wherein the generated report is a first generated report, further comprising:

for a source code repository associated with an identified software asset, receiving modification to the source code repository, the modification causing one or more of: renaming the source code repository or moving of a path of the source code repository in the source code; and generating a second report based on the source code repositories associated with each of the one or more software assets, wherein the information describing the identified software asset in the second report matches the information describing the identified software asset in the first report.

9. The method of claim 1, further comprising:

for each of one or more source code repositories, identifying the set of software assets built using the source code repository based on the software asset information document of the source code repository;

determining a metric indicating a level of usage of the source code repository based on the level of usage of each of the set of software assets built using the source code repository; and reporting the metric indicating the level of usage of the source code repository.

10. The method of claim 1, wherein the request is an auditing request for the one or more software assets, the method further comprising:

for each of the source code repositories associated with the one or more software assets, accessing the build logs; and extracting information describing the certification criteria for deployment of software assets based on the source code repositories from the build logs; and including the information extracted from the build logs in the auditing request.

11. A computer readable non-transitory storage medium storing instructions thereon, the instructions when executed by a processor cause the processor to perform the steps of:

storing, in a build system, a plurality of source code repositories, wherein a source code repository includes a software asset information document identifying one or more software assets build using the source code repository, wherein each software asset is deployed as an executable file generated by compiling source code stored in one or more source code repositories;

receiving, from a requestor, a request identifying one or more software assets built using source code repositories stored in the build system;

for each of the one or more software assets identified in the request, obtaining information describing source code repositories associated with the software asset comprising:

identifying one or more source code repositories wherein the software asset information document of each identified source code repository identifies the software asset; and extracting one or more attributes of each of the one or more source code repositories;

generating a report based on the source code repositories associated with each of the one or more software assets, the report based on attributes of the source code repositories; and sending the generated report to the requestor.

12. The computer readable non-transitory storage medium of claim 11, wherein the instructions when executed by the processor, further cause the processor to perform the step of:

for a source code repository associated with an identified software asset, determining a certification criteria for deployment artifacts based on information describing the identified software asset.

13. The computer readable non-transitory storage medium of claim 11, wherein the instructions when executed by the processor, further cause the processor to perform the step of:

for a source code repository associated with an identified software asset, adjusting schedule of one or more tasks associated with the source code repository based on information describing the identified software asset.

14. The computer readable non-transitory storage medium of claim 13, wherein the one or more tasks comprise development or testing of a feature associate with the source code repository or fixing a defect in the source code repository.

15. The computer readable non-transitory storage medium of claim 13, wherein the information describing the identified software asset comprises, one or more of:
a rate of download of a deployment artifact for the software asset,
a rate of user interactions with the software asset.

16. The computer readable non-transitory storage medium of claim 11, wherein the instructions when executed by the processor, further cause the processor to perform the step of:
for a source code repository associated with an identified software asset, identifying a set of users associated with development of the source code repository and sending a message associated with the software asset to the set of users.

17. The computer readable non-transitory storage medium of claim 11, wherein the one or more attributes comprise a number of defects in the source code repository that were either identified or fixed in a particular time interval, the generated report describing the number of defects associated with software assets.

18. The computer readable non-transitory storage medium of claim 11, wherein the generated report is a first generated report, wherein the instructions when executed by the processor, further cause the processor to perform the step of:
for a source code repository associated with an identified software asset, receiving modification to the source code repository, the modification causing one or more of: renaming the source code repository or moving of a path of the source code repository in the source code; and
generating a second report based on the source code repositories associated with each of the one or more software assets, wherein the information describing the identified software asset in the second report matches the information describing the identified software asset in the first report.

19. The computer readable non-transitory storage medium of claim 11, wherein the instructions when executed by the processor, further cause the processor to perform the step of:
for each of one or more source code repositories, identifying the set of software assets built using the source code repository based on the software asset information document of the source code repository;
determining a metric indicating a level of usage of the source code repository based on the level of usage of each of the set of software assets built using the source code repository; and
reporting the metric indicating the level of usage of the source code repository.

20. The computer readable non-transitory storage medium of claim 11, wherein the request is an auditing request for the one or more software assets, the method further comprising:
for each of the source code repositories associated with the one or more software assets, accessing the build logs; and
extracting information describing the certification criteria for deployment of software assets based on the source code repositories from the build logs; and
including the information extracted from the build logs in the auditing request.

21. A computer system, comprising:
a computer processor; and
a computer readable non-transitory storage medium storing instructions thereon, the instructions when executed by the processor cause the processor to perform the steps of:
storing, in a build system, a plurality of source code repositories, wherein a source code repository includes a software asset information document identifying one or more software assets build using the source code repository, wherein each software asset is deployed as an executable file generated by compiling source code stored in one or more source code repositories;
receiving, from a requestor, a request identifying one or more software assets built using source code repositories stored in the build system;
for each of the one or more software assets identified in the request, obtaining information describing source code repositories associated with the software asset comprising:
identifying one or more source code repositories wherein the software asset information document of each identified source code repository identifies the software asset; and
extracting one or more attributes of each of the one or more source code repositories;
generating a report based on the source code repositories associated with each of the one or more software assets, the report based on attributes of the source code repositories; and
sending the generated report to the requestor.

* * * * *